United States Patent

[11] 3,600,663

| [72] | Inventor | Ronald H. Wagner<br>Fremont, Calif. |
|---|---|---|
| [21] | Appl. No. | 846,486 |
| [22] | Filed | July 31, 1969 |
| [45] | Patented | Aug. 17, 1971 |
| [73] | Assignee | Ampex Corporation<br>Redwood City, Calif. |

[54] VOLTAGE REGULATED POWER SUPPLY HAVING LOW RIPPLE FACTOR
5 Claims, 1 Drawing Fig.

[52] U.S. Cl............................................. 321/10,
321/18, 323/22 T, 323/32, 330/26, 333/79
[51] Int. Cl....................................... H02m 1/14,
G05f 1/00
[50] Field of Search.......................... 321/10, 18;
323/4, 9, 16—22, 22 T, 32; 333/79; 330/25, 26

[56] References Cited
UNITED STATES PATENTS
3,474,346  10/1969  Schaeffer..................... 330/25

| 3,371,269 | 2/1968 | Wattson...................... | 323/22 T |
| 3,378,758 | 4/1968 | Goodenow.................. | 323/18 |
| 3,486,104 | 12/1969 | Epstein....................... | 321/10 |

OTHER REFERENCES

Transistor Circuit Design Edited by J. A. Walston and J. R. Miller; McGraw-Hill (Pub); 1963; pgs. 156 and 157 Relied upon; Copy in Sci. Lib. (TK 7872.T73T4t)

*Primary Examiner*—Gerald Goldberg
*Attorney*—Robert G. Clay

ABSTRACT: A high-gain AC amplifier is coupled to amplify the AC signal components forming the ripple voltage superimposed on the regulated DC output voltage provided by a regulated DC power supply. The amplified AC signal components are coupled to the control electrode of a series pass voltage regulator of the power supply as an AC error signal to cancel AC signal components coupled thereto from a source of unregulated voltage serving as the primary power source.

PATENTED AUG 17 1971 3,600,663
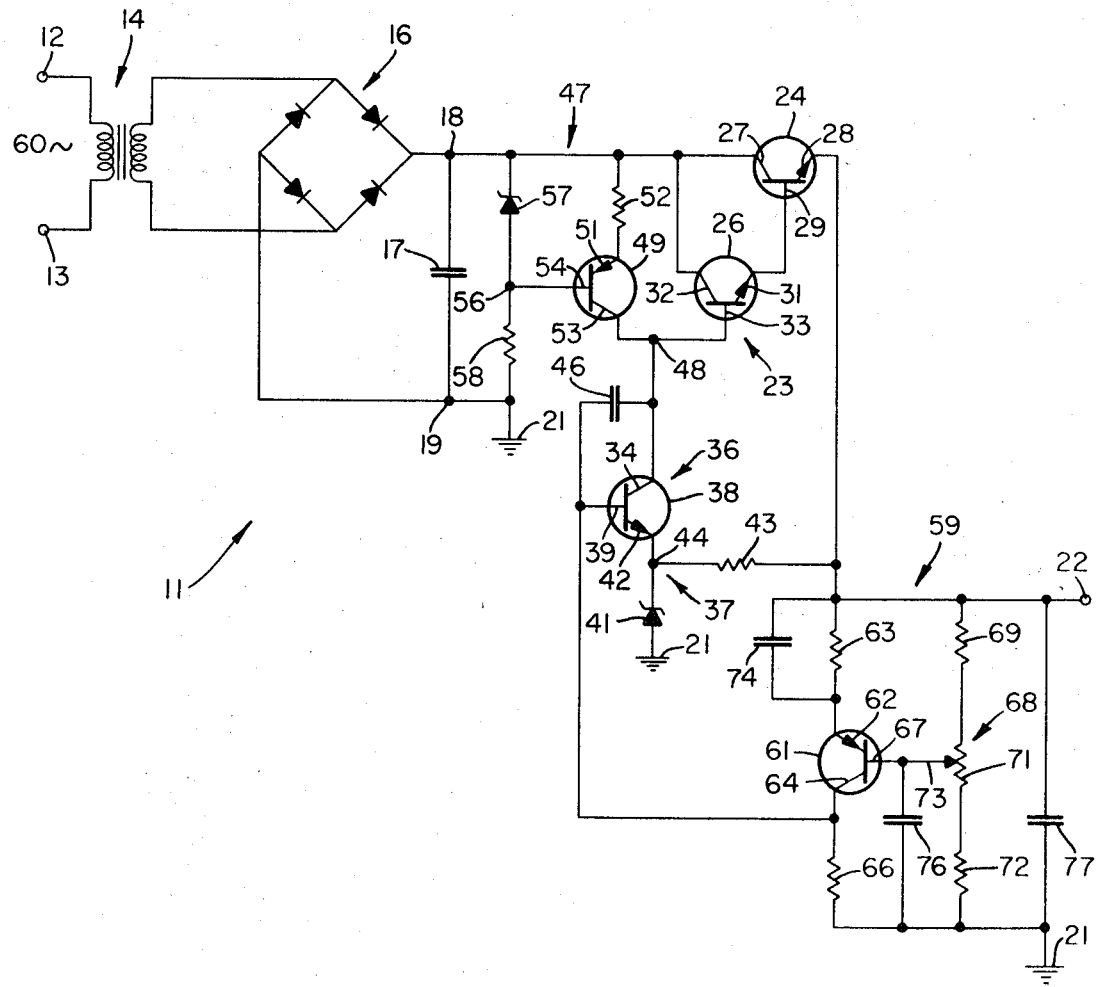
INVENTOR.
RONALD H. WAGNER
BY Robert S. Clay
ATTORNEY

VOLTAGE REGULATED POWER SUPPLY HAVING LOW RIPPLE FACTOR

FIELD OF THE INVENTION

The present invention relates to voltage regulated power supplies and, more particularly, to voltage regulated power supplies providing a regulated DC output voltage with a low ripple factor.

BACKGROUND OF THE INVENTION

Power supplies providing a direct current (DC) voltage from a fluctuating or alternating current (AC) voltage source are commonly employed to operate electrical equipment. Most electrical equipment require power supplies which are able to maintain a constant output DC voltage under varying load conditions. Furthermore, often it is desired that the output DC voltage provided to operate electrical equipment have a low ripple factor, i.e., the AC signal components superimposed on the constant output DC voltage be less than about 0.001 percent of the output DC voltage over a frequency range of 0 to 1 kHz. Heretofore, complex and expensive circuits have been required to achieve such low ripple factors. Also, such low ripple factors have been realized at the expense of an undesirable substantial increase in the internal power consumption of the power supplies. Moreover, regulated DC power supplies having a ripple factor of one or more orders of magnitude less than 0,001 percent have not heretofore been available in the market or known to exist in the laboratory.

Therefore, considerable advantage is to be gained by providing a power supply which generates a regulated DC voltage with a low ripple factor without the addition of complex, expensive and excessive power consuming circuitry. Additional advantages are to be realized by providing a regulated DC voltage having superimposed AC signal components substantially less than about 0.001 of a percent of the regulated DC voltage over a frequency range of 0 to 1 kHz.

SUMMARY OF THE INVENTION

Accordingly, it is an object of the present invention to minimize the AC signal components superimposed on a regulated DC voltage.

More particularly, it is an object of the present invention to maintain the AC signal components superimposed on a regulated DC voltage below about 0.001 percent of the regulated DC voltage over a defined frequency range.

Another object of the present invention is to maintain the AC signal components superimposed on a regulated DC voltage substantially below about 0.001 percent of the regulated DC voltage over a frequency range of about 0 to 1 kHz.

In accordance with the present invention, the AC signal components forming the ripple voltage superimposed on a regulated DC voltage are coupled to a high-gain AC amplifier, i.e., an amplifier having an open-loop AC gain greater than 10. The amplifier AC signal components are coupled by a feedback means to provide an AC error signal to the control electrode of an active variable impedance DC regulating means serially connected between the input and output terminals of the regulated DC power supply providing the regulated DC output voltage. The feedback means is arranged to couple the AC error signal to the control electrode in phase opposition to corresponding AC signal components coupled to the active variable impedance means from the source of unregulated voltage providing the primary source of power whereby the magnitude of the AC signal components superimposed on the regulated DC output voltage is decreased.

Consistent with the limitations imposed by standard stability criteria, the AC gain of the AC amplifier can be increased whereby the AC signal components superimposed on the regulated DC output voltage can be reduced to extremely low levels, for example, less than 0.0001 percent of the regulated DC output voltage over a frequency range of 0 to 1 kHz. To achieve such low levels of ripple voltage, the noise figure of the AC amplifier should be less than 2 in the frequency range it is desired to decrease the AC signal components forming the ripple voltage. Constructing the AC amplifier to have a noise figure less than 2 prevents the generation of a large noise component superimposed on the regulated DC output voltage.

Employing a high-gain AC amplifier, particularly, one having a noise figure of less than 2 in the frequency range it is desired to decrease the AC signal components, to amplify the AC signal components superimposed on the DC output voltage of the power supply and generating a corrective signal to cancel corresponding AC signal components present in the power supply makes it possible to obtain from AC power sources DC voltages with exceedingly low ripple factors. Furthermore, such ripple factors can be achieved much easier, with less expense and with lower power consumption by employing an AC amplifier than by using the prior art techniques and systems.

BRIEF DESCRIPTION OF DRAWING

The foregoing and other advantages and features of the present invention will become more apparent from the following description and claims considered together with the accompanying single FIGURE with is a schematic circuit diagram of a preferred embodiment of the power supply of the present invention.

DESCRIPTION OF THE PREFERRED EMBODIMENT

Referring to the single FIGURE of the power supply 11 of the present invention, a primary source of power, such as from 60 cycle AC line voltage, is coupled to the input terminals 12 and 13 of a power transformer 14. The power transformer 14 transformingly couples the primary source of power to the input of a common full-wave bridge rectifier 16. A filter capacitor 17 is coupled between the output terminals 18 and 19 of the bridge rectifier 16, one of which is referenced to ground 21. The bridge rectifier 16 together with the filter capacitor 17 converts the transformingly coupled 60 cycle AC line voltage to a DC voltage of a selected magnitude. Although a DC voltage appears across the filter capacitor 17, an AC voltage is superimposed upon it. This AC voltage component of the voltage appearing across the filter capacitor 17 is referred to as the ripple voltage. The AC ripple voltage consists of a fundamental frequency and a series of harmonically related frequencies. For full-wave rectifier type power supplies, the fundamental frequency equals twice the frequency of the primary source of AC power or, in the preferred embodiment described, 120 cycles.

The DC voltage generated across the filter capacitor 17 is unregulated, hence, subject to variation. To regulate the DC voltage provided by the power supply 11 at its output terminals 22 and, thereby, prevent variations therein due to, for example, changes in the load coupled to the output terminals 22, an active variable impedance regulating means 23 is serially connected between the terminal 18 of the bridge rectifier 16 and the output terminal 22. The regulating means 23 of the illustrated embodiment includes two like conductivity transistors 24 and 26 arranged in a compound connection as a series pass type regulating means 23 to form a common beta multiplier. The transistor 24 has its collector electrode 27 connected to the output terminal 18 of the bridge rectifier 16 and its emitter electrode 28 connected to the output terminal 22 of the power supply 11. The base electrode 29 of the transistor 24 is connected to the emitter electrode 31 of the transistor 26. The collector electrode 32 of the transistor 26 is connected to the collector electrode 27 of the transistor 24. Additional like conductivity transistors can be similarly connected in circuit with transistors 24 and 26 if additional current gain is necessary to maintain the desired load current. Alternatively, at low levels of load current, only one transistor, i.e., transistor 24 would be required.

The base electrode 33 of transistor 26 serves as the control electrode of the variable impedance regulating means 23. It is connected to the output electrode 34 of a DC amplifier 36 which provides thereto a DC error signal of the proper polarity to cause the load current to change and correct for any change in the DC output voltage. The DC error signal is generated by comparing a signal representative to the DC output voltage to a reference voltage in comparator 37. The comparator 37 produces a signal that is proportional to any difference which is amplified by the amplifier 36 to provide the DC error signal. In the illustrated embodiment, a single transistor 38, complimentary in conductivity to the transistors 24 and 26, is employed as the DC amplifier 36. The collector or output electrode 34 of the transistor 38 is connected directly to the base electrode 33 of the transistor 26 of the compoundly connected transistors 24 and 26 forming the series pass regulating means 23. The base electrode 39 of the DC amplifier transistor 38 receives the signal representative of the DC output voltage present at the output terminal 22. The comparison of the representative signal and reference voltage is effected by a Zener diode 41 serially connected between the emitter electrode 42 of the DC amplifier transistor 38 and ground 21. The Zener diode 41 is connected to the emitter electrode 42 to oppose current flow therefrom. The Zener diode 41 is selected so that a reverse-current breakdown voltage is obtained which is equal to the desired reference voltage. A resistor 43 is connected between the output terminal 22 of the DC power supply 11 and the junction 44 of the Zener diode 41 and emitter electrode 42 of the DC amplifier transistor 38 to bias the Zener diode 41 at the desired operating point. The capacitor 46 connected between the collector electrode 34 and base electrode 39 of the DC amplifier transistor 38 functions as a phase shift capacitor.

To reduce the AC signal components superimposed on the DC output voltage, a preregulator 47 is coupled to provide a constant current to the collector electrode 34 of the DC amplifier transistor 38 and the base electrode 33 of the regulator transistor 26 at the junction 48. In the illustrated embodiment, the preregulator 47 includes a transistor 49, complimentary in conductivity to the series regulator transistors 24 and 26, having an emitter electrode 51 connected through an emitter resistor 52 to the output terminal 18 of the bridge rectifier 16. The collector electrode 53 of the preregulator transistor 49 is connected directly to the junction 48. To maintain a constant voltage at the base electrode 54 of the preregulator transistor 49 and, hence, a constant current to junction 48 of the collector electrode 34 of the DC amplifier transistor 38 and base electrode 33 of the series regulator transistor 26, the base electrode 54 is connected to the junction 56 of the serially connected Zener diode 57 and resistor 58. The serially connected Zener diode 57 and resistor 58 are connected between the output terminals 18 and 19 of the bridge rectifier 16. The Zener diode 57 is connected to oppose current flow from the bridge rectifier 16, and is selected so that a reverse-current breakdown voltage is obtained which is equal to the desired base voltage. The resistor 58 is selected to bias the Zener diode 57 at the desired operating point.

The power supply as thus far described is commonly employed in the art to provide a regulated DC voltage from an unregulated AC power source. Such regulated power supplies are described in the reference "Transistor Circuit Design" edited by Joseph A. Walston and John R. Miller, published by McGraw-Hill Book Company, Inc., New York, 1963, PP 145—166. Typical DC voltage regulators of the type described hereinbefore are illustrated in FIGS. 9.12 and 9.13 of this reference. While the preregulator 47 and DC feedback provided by the DC amplifier 36 reduce the ripple voltage from that which would be present in their absence, such power supplies still are characterized by having ripple factors on the order of 0.001 percent or greater of the output DC voltage over a frequency range of 0 to 1 kHz.

In several power supply applications a ripple factor of this magnitude is undesirably large and often cannot be tolerated. For example, preamplifiers employed as the initial stage of amplification in the reproduce electronics associated with magnetic recording and reproducing systems often are required to amplify signals whose magnitudes are less than the ripple voltage component superimpose on the regulated DC output voltage provided by power supplies of the type described in the above reference. In accordance with the present invention, a high-gain AC amplifier 59 is employed to reduce the ripple voltage commonly superimposed on the DC output voltage provided by such power supplies. The AC amplifier 59 is coupled to amplify a signal representative of the AC signal components superimposed on the regulated DC output voltage at the output terminal 22. The amplified AC signal is fed back as an AC error signal to the control or base electrode 33 of the series regulator transistor 49 at the junction 48. The AC amplifier 59 and associated feedback circuitry is arranged so that the AC error signal fed back to the junction 48 is in phase opposition to the corresponding AC signal components coupled thereto by the preregulator 47 from the bridge rectifier 16. Since the AC error signal is in phase opposition to the AC signal components present at the junction 48, a cancelling effect is obtained which reduces the magnitude of the AC signal components forming the ripple voltage component of the regulated DC output voltage at the output terminal 22.

Consistent with the limitations imposed by standard stability criteria, the AC gain of the AC amplifier can be increased whereby the AC signal components forming the ripple voltage can be reduced to extremely low levels. In a power supply 11 constructed with circuit components having the values detailed hereinbelow to provide a regulated DC output voltage of 12 volts, the AC amplifier had an open-loop AC gain of 100 over a bandwidth of about 5 Hz. to 50 kHz. The ripple voltage formed by the AC signal components in the frequency range of 0 to 1 kHz. were reduced to 7 microvolts. This represents a ripple factor of less than 0.0001 percent. Considering the particular embodiment of the power supply 11 illustrated in the FIGURE, the AC amplifier 59 is arranged in circuit with the DC amplifier 36 so that both amplifiers provide AC and DC gain. The AC amplifier 59 is arranged to provide high open-loop AC gain, i.e., greater than 10, preferably, at least 100, and nominal open-loop DC gain approaching unity. The DC amplifier 36 is arranged to provide a high open-loop DC and open-loop AC gains of about 800. While the illustrated embodiment shows a common path for the DC error signal and the AC error signal, the DC amplifier 36 and the AC amplifier 59 could be arranged to provide separate AC and DC paths from the output terminal 22 to the junction 48. By employing a high-gain AC amplifier which provides substantial AC gain and essentially no DC gain, it is possible to obtain a stage of AC amplification with a noise figure of less than 2. As will be described hereinbelow, this facilitates generating regulated DC output voltages with extremely low ripple factors of less than 0.0001 percent.

The AC amplifier 59 includes a transistor 61 complimentary in conductivity to the DC amplifier transistor 38. The emitter electrode 62 of the transistor 61 is connected in series with an emitter resistor 63 to the output terminal 22 of the power supply 11. The collector electrode 64 is connected in series with a collector resistor 66 to ground 21. The values of the resistors 63 and 66 are selected so that the DC gain of the AC amplifier 59 is about unity. A sample signal representative of the output voltage present at the output terminal 22 is provided to the base electrode 67 by a voltage divider network 68 connected between the output terminal 22 and ground 21. The voltage divider network 68 includes three serially connected resistors 69, 71 and 72, the intermediate of which is a potentiometer type resistor 71. The base electrode 67 is connected to the wiper arm 73 of the potentiometer 71.

To achieve high AC gain, an AC bypass capacitor 74 is connected in parallel with the emitter resistor 63. The bypass capacitor 74 AC couples the emitter electrode 62 to the output terminal 22 whereby a high AC gain is realized through the transistor 61. This AC gain is approximately equal to the ratio of the resistance of the collector resistor 66 to the intrinsic emitter resistance of the transistor 61. By using a large capacitor 74, for example, on the order of 1,000 mf., open-loop AC gains on the order of 100 can be obtained. The amplitude of the AC signal provided at the collector electrode 64 of the amplifier 59 is enchanced by providing a bypass capacitor 76 between the base electrode 67 and ground 21. The bypass capacitor 76 provides a virtual AC ground at the base electrode 67, thereby, maximizing the AC emitter-to-base voltage, hence, amplified AC signal at the collector electrode 64. The capacitor 77 connected between the output terminal and ground 21 is an additional filter capacitor which aids in reducing the ripple voltage.

In operation, the high-gain AC amplifier 59 issues an amplified AC signal representative of the AC signal components forming the ripple voltage offset by a DC signal representative of the regulated DC output voltage. The collector electrode 64 of the AC amplifier transistor 61 is directly connected to the base electrode 39 of the DC amplifier transistor 38, thereby, coupling both the representative AC and DC signals thereto. Because of the relative conductivities of the transistors 38 and 61 and the circuit arrangement, the DC amplifier transistor 38 issues the AC and DC error signals to the junction 48 in phase opposition to the AC signal components thereat and to changes in the DC output voltage at terminal 22 of the power supply 11 respectively. With this AC and DC negative feedback, a regulated DC output voltage with a very low ripple factor is obtained.

To facilitate the elimination of all AC signals including noise signals, the AC amplifier 59 is constructed to have a noise figure of less than 2. At noise figures equal to 2 or greater, the noise signal at the output of the AC amplifier 59 is equal to or greater than that at its input. If the AC amplifier 59 has a noise figure equal to or greater than 2, noise may be generated at the output terminal 22 which is greater than the magnitude to which it is desired to limit the AC signal components superimposed on the regulated DC output voltage. To maintain the noise figure of the AC amplifier 59 less than 2, a low level, low noise type transistor 61 is employed. Metal film type resistors 69 and 72 are used in the voltage divider 68. A potentiometer having a metal dielectric type resistive element is employed as the voltage divider potentiometer 71.

A power supply 11 constructed to provide from a 21 volts RMS AC voltage across the secondary of the transformer 14 a regulated DC output voltage of 12 volts having a superimposed ripple voltage of 7 microvolts over a frequency range of 0 to 1 kHz. had the following components:

| | |
|---|---|
| Transistor 23 | 2N3713. |
| Transistor 24 | 2N2219. |
| Transistor 38 | 2N2219. |
| Transistor 49 | 2N2905. |
| Transistor 61 | 2N3790. |
| Zener diode 41 | 1N754. |
| Zener diode 57 | 1N752. |
| Resistor 43 | 1.5KΩ. |
| Resistor 52 | 6.2KΩ. |
| Resistor 58 | 3.0KΩ. |
| Resistor 63 | 2.0KΩ. |
| Resistor 66 | 7.5KΩ. |
| Metal film resistor 69 | 150Ω. |
| Metal film resistor 72 | 820Ω. |
| Metal-dielectric potentiometer 71 | 110Ω. |
| Capacitor 17 | 4,000 microfarads. |
| Capacitor 46 | 300 picofarads. |
| Capacitor 74 | 1,000 microfarads. |
| Capacitor 76 | 100 microfarads. |
| Capacitor | 1,000 microfarads. |

It will be appreciated from the foregoing description that the ripple voltage can be reduced further by increasing the AC gain of the AC amplifier 59. Furthermore, ripple factors on the order of 0.0001 percent of the DC output voltage be realized over frequency ranges greater than 0 to 1 kHz. by using high-gain AC amplifiers having greater bandwidths or having greater gains.

What is claimed is:

1. In a power supply providing a regulated DC output voltage to a load from a source of unregulated input voltage and including an active variable impedance means having input, output and control electrodes, the active variable impedance means connected with its input and output electrodes in series with the source and the load, a voltage comparator means coupled to compare the regulated DC output voltage with a reference voltage and generate a DC signal representative of a DC error in said regulated DC output voltage, a DC amplifier coupled to amplify the representative signal and provide a DC error signal to the control electrode of the active variable impedance means to change its impedance and correct the DC error in the regulated DC output voltage, and a constant current generator coupled to provide a constant current load to the control electrode of the active variable impedance means and DC amplifier from the source of unregulated input voltage, the combination therewith comprising; a high-gain AC amplifier without significant DC gain relative to the AC gain having an input terminal and an output terminal, said input terminal coupled to receive a signal representative of the instantaneous voltage of AC signal components superimposed on the regulated DC output voltage, said AC amplifier responsive to the superimposed AC signal components to generate at its output terminal an amplifier AC signal without corresponding amplification of any DC voltage present at the input terminal, and feedback means coupled to the output terminal of the AC amplifier to receive the amplified AC signal and provide an AC error signal to the control electrode of the active variable impedance means in phase opposition to corresponding AC signal components coupled thereto from the source of unregulated input voltage.

2. The power supply according to claim 1 wherein the high-gain AC amplifier has a DC gain of about unity, the input terminal of said high-gain AC amplifier is coupled to receive a signal representative of the regulated DC output voltage and the superimposed instantaneous voltage of the AC signal components, said AC amplifier generates at its output terminal the amplified AC signal components superimposed on a DC voltage which varies according to the change in the regulated DC output voltage, the output terminal of the AC amplifier is directly coupled to an input of said DC amplifier, said DC amplifier responsive to the output of the AC amplifier to amplify the instantaneous difference between the DC voltage with the superimposed amplified AC signal components and the said reference voltage to provide to the control electrode of said active variable impedance means a composite error signal including the AC error signal superimposed on the DC error signal.

3. The power supply according to claim 2 wherein the AC gain of the AC amplifier and the gain of the DC amplifier are set and the signal representative of the regulated DC output voltage and superimposed AC signal components is selected to maintain the power supply unconditionally stable while substantially cancelling the DC error and AC signal components present in the regulated DC output voltage in a selected frequency range.

4. The power supply according to claim 2 wherein the active variable impedance means includes at least one control transistor having collector, emitter and base, the collector and emitter connected in series and poled to conduct current between one terminal of the source and one side of the load, the other side of the load is coupled to the other terminal of the source, the DC amplifier is a transistor having collector, emitter and base, the collector and emitter coupled in series and poled to conduct current between the base of the control transistor and other terminal of the source, the voltage comparator means includes a Zener diode and resistor network connected in parallel with the load and to the emitter and base circuit of the DC amplifier the Zener diode is reversed biased to provide the reference voltage to bias the emitter and base junction of the DC amplifier transistor so that a change in the regulated DC output voltage is productive of a proportionate change in the emitter-to-collector current of the DC amplifier transistor, the constant current generator provides a constant current to the base of the control transistor and the emitter and collector circuit of the DC amplifier transistor so that a change in the emitter-to-collector current of the DC amplifier transistor causes an inversely proportioned change in the base current and hence impedance of the control transistor, and the high-gain AC amplifier is a transistor having a collector, emitter and base, the collector and emitter connected and poled to conduct current in parallel with the load, the emitter electrode connected in series with a parallel connected emitter resistor and AC bypass capacitor, the collector electrode connected in series with a collector resistor, the collector directly connected to the base of the DC amplifier transistor, the base of the AC amplifier transistor coupled to receive a signal representative of the regulated DC output voltage and superimposed AC signal components.

5. The power supply according to claim 4 wherein the collector resistor of the AC amplifier transistor has an impedance of a magnitude on the order of the magnitude of the emitter resistor, the capacitor has an impedance over a selected frequency of at least one order of magnitude less than the impedance of the collector resistor.